United States Patent
Jia et al.

(10) Patent No.: US 11,113,247 B1
(45) Date of Patent: Sep. 7, 2021

(54) ROUTING I/O REQUESTS TO IMPROVE READ/WRITE CONCURRENCY

(71) Applicant: Veritas Technologies LLC, Mountain View, CA (US)

(72) Inventors: Yingsong Jia, Beijing (CN); Xiangrui Liu, Beijing (CN); Hong Yu Jia, Beijing (CN); Shengzhao Li, Shanghai (CN)

(73) Assignee: Veritas Technologies LLC, Santa Clara, CA (US)

( * ) Notice: Subject to any disclaimer, the term of this patent is extended or adjusted under 35 U.S.C. 154(b) by 445 days.

(21) Appl. No.: 15/150,649

(22) Filed: May 10, 2016

(51) Int. Cl.
G06F 16/176 (2019.01)
G06F 16/11 (2019.01)
G06F 16/182 (2019.01)
G06F 16/174 (2019.01)

(52) U.S. Cl.
CPC ........ *G06F 16/1767* (2019.01); *G06F 16/122* (2019.01); *G06F 16/1748* (2019.01); *G06F 16/182* (2019.01)

(58) Field of Classification Search
CPC .. G06F 16/1767; G06F 16/182; G06F 16/122; G06F 16/1748; G06F 17/30168; G06F 17/30156; G06F 17/30194; G06F 17/30082
See application file for complete search history.

(56) References Cited

U.S. PATENT DOCUMENTS

| | | | |
|---|---|---|---|
| 4,467,421 A | 8/1984 | White | |
| 5,247,638 A | 9/1993 | O'Brien et al. | |
| 5,996,022 A | 11/1999 | Krueger et al. | |
| RE36,989 E | 12/2000 | White | |
| 6,308,222 B1 | 10/2001 | Krueger et al. | |
| 6,496,868 B2 | 12/2002 | Krueger et al. | |
| 6,976,026 B1 | 12/2005 | Getzinger et al. | |
| 7,085,781 B2 * | 8/2006 | Crow | G06F 16/10 707/823 |
| 7,099,514 B2 | 8/2006 | Getzinger et al. | |
| 7,558,801 B2 | 7/2009 | Getzinger et al. | |
| 7,698,501 B1 * | 4/2010 | Corbett | H04L 67/1095 711/114 |
| 7,747,584 B1 * | 6/2010 | Jernigan, IV | G06F 16/1748 707/692 |
| 7,865,485 B2 * | 1/2011 | Mullick | G06F 16/1774 707/704 |
| 7,870,356 B1 * | 1/2011 | Veeraswamy | G06F 3/0607 711/162 |
| 7,945,726 B2 * | 5/2011 | Faibish | G06F 3/061 711/112 |

(Continued)

*Primary Examiner* — Miranda Le
(74) *Attorney, Agent, or Firm* — Rory D. Rankin; Kowert, Hood, Munyon, Rankin & Goetzel, P.C

(57) ABSTRACT

Systems, apparatuses, methods, and computer readable mediums for implementing an I/O router to route requests based on characteristics of the requests. The I/O router may receive requests targeting a single file, and the I/O router may route requests to multiple extent maps based on characteristics of the requests. For example, requests of a first size may be mapped to a first extent map, requests of a second size may be mapped to a second extent map, requests of a third size may be mapped to a third extent map, and so on. Additionally, the system may utilize different deduplication policies for the different types of requests which are mapped to different extent maps.

20 Claims, 8 Drawing Sheets

(56) References Cited

U.S. PATENT DOCUMENTS

| | | | |
|---|---|---|---|
| 8,140,603 B2 | 3/2012 | Getzinger et al. | |
| 8,200,637 B1* | 6/2012 | Stringham | G06F 11/1451 707/670 |
| 8,370,404 B2 | 2/2013 | Getzinger et al. | |
| 8,380,894 B2* | 2/2013 | Gordon | G06F 3/0607 370/389 |
| 8,549,252 B2* | 10/2013 | Mane | G06F 16/128 711/202 |
| 8,635,429 B1* | 1/2014 | Naftel | G06F 11/1446 711/206 |
| 8,645,335 B2* | 2/2014 | Gupta | G06F 16/1748 707/692 |
| 8,825,963 B1* | 9/2014 | Edwards | G06F 11/1076 711/147 |
| 8,903,877 B1* | 12/2014 | Vempati | G06F 3/0611 707/828 |
| 8,983,952 B1* | 3/2015 | Zhang | G06F 11/1453 707/736 |
| 8,984,097 B1 | 3/2015 | Shyam et al. | |
| 9,256,609 B2* | 2/2016 | Rao | G06F 3/0608 |
| 9,557,937 B2* | 1/2017 | Gupta | G06F 3/0619 |
| 9,576,012 B2* | 2/2017 | Zhang | G06F 12/023 |
| 9,778,856 B2* | 10/2017 | Fan | G06F 3/0613 |
| 9,785,647 B1* | 10/2017 | Petri | G06F 16/196 |
| 2001/0014123 A1 | 8/2001 | Strasman et al. | |
| 2002/0116593 A1* | 8/2002 | Kazar | G06F 17/30091 711/202 |
| 2005/0066095 A1* | 3/2005 | Mullick | G06F 16/1774 710/200 |
| 2005/0147310 A1 | 7/2005 | Getzinger et al. | |
| 2005/0226514 A1 | 10/2005 | Getzinger et al. | |
| 2006/0242182 A1 | 10/2006 | Palaniappan et al. | |
| 2006/0271601 A1 | 11/2006 | Fatula, Jr. et al. | |
| 2008/0162523 A1 | 7/2008 | Kraus et al. | |
| 2008/0243860 A1 | 10/2008 | Cannon | |
| 2009/0238475 A1 | 9/2009 | Getzinger et al. | |
| 2011/0119228 A1 | 5/2011 | Menze et al. | |
| 2012/0047115 A1 | 2/2012 | Subramanya et al. | |
| 2012/0134600 A1 | 5/2012 | Getzinger et al. | |
| 2012/0166403 A1* | 6/2012 | Kim | G06F 17/30156 707/692 |
| 2012/0271868 A1 | 10/2012 | Fukatani et al. | |
| 2013/0159645 A1 | 6/2013 | Anglin et al. | |
| 2014/0201168 A1* | 7/2014 | Periyagaram | G06F 3/0608 707/692 |

* cited by examiner

ROUTING I/O REQUESTS TO IMPROVE READ/WRITE CONCURRENCY

BACKGROUND

Technical Field

Embodiments described herein relate to data processing and more particularly, to routing input/output (I/O) requests to improve read/write (R/W) concurrency.

Description of the Related Art

Database systems contain vast amounts of information generated and used by a variety of software applications. Because of the importance of the information stored in databases, a database system typically provides mechanisms to backup and restore the databases managed by that system. For some database systems (e.g., Oracle® automatic storage management (ASM)), database files, metadata, and log files may be stored in a single sparse file which is exported as a block device to the database application. Additionally, the file system may allocate a single extent map for the single sparse file, with the extent map being shared by requests targeting different types of data. Access to the single sparse file may be serialized, resulting in a slowdown of I/O to the sparse file. Accordingly, the writes of metadata and log files may block the reads/writes of database files.

SUMMARY

Systems, apparatuses, and methods for routing input/output (I/O) requests to improve read/write (R/W) concurrency are disclosed.

In one embodiment, a system may include a database application, a file system, I/O router, one or more memory devices, and one or more storage devices. In one embodiment, the file system may be an extent-based file system which uses extent maps to map files to the physical storage locations storing the actual data. Rather than using a single extent map to manage all I/O requests targeting a single file, I/O requests may be sorted and routed to different extent maps and data container zones based on characteristics of the I/O requests. In one embodiment, I/O requests may be sorted and routed based on the size of the individual I/O request.

In one embodiment, a backup of a database may be created and stored as a single sparse file. The sparse file may be exported as a block device to the database application and/or other applications. In one embodiment, the sparse file may have three different extent maps, with a different data container zone for each extent map. In this embodiment, I/O requests of size greater than or equal to 8 KB may be routed to a first extent map, I/O requests of size 4 KB may be routed to a second extent map, and I/O requests of size less than 4 KB may be routed to a third extent map. In other embodiments, other thresholds may be used for sorting and routing I/O requests. Also, in other embodiments, other numbers of extent maps may be utilized. Additionally, different deduplication policies may be utilized for the different extent maps and data container zones.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
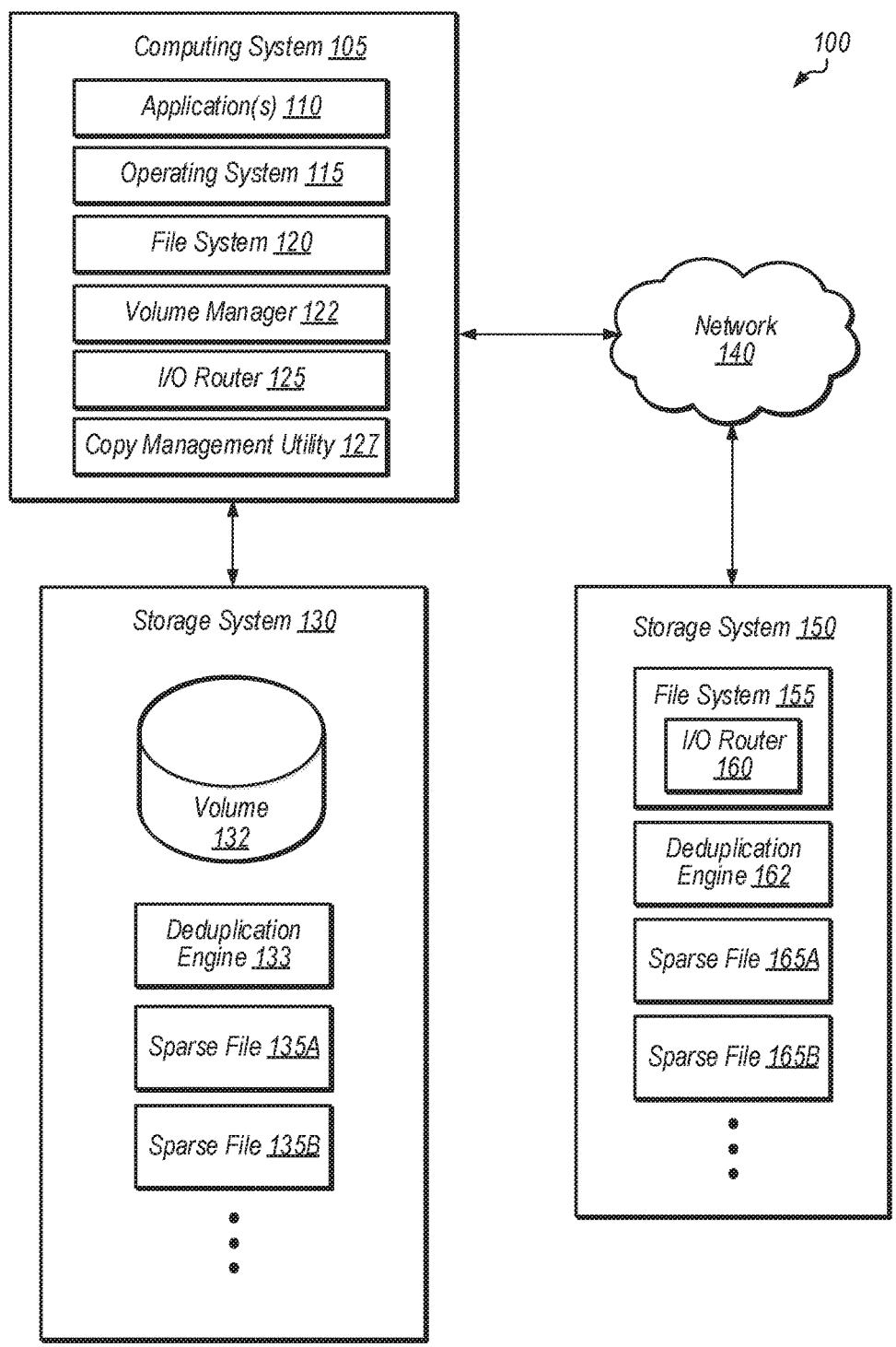
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display unit, a storage unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to"

language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system 100 is shown. System 100 may include computing system 105, storage system 130, storage system 150, and network 140. Computing system 105 may be configured to run various software applications and programs that access data in storage systems 130 and 150. Depending on the embodiment, computing system 105 may be a computer, workstation, server, mobile device, storage controller, or other computing system or device.

Application(s) 110 are representative of any number and type of software applications (e.g., database application) that may execute on computing system 105 and access data in one or more of volume 132 or sparse files 135A-B on storage system 130 and/or access data in one or more of sparse files 165A-B on storage system 150. Operating system 115 may include software that performs basic functions required for management and operation of computing system 105.

File system 120 may organize and provide access to volume 132, sparse files 135A-B, and sparse files 165A-B. As used herein, the term "file system" may be defined as a software component that manages one or more block storage spaces and presents the file abstraction to applications and other clients. The term "file system" may also refer to the block storage space managed by software modules and the files stored in this block storage space. The term "file system" may also be defined as a software component providing structured access to storage media. File systems present objects, such as files, to application(s) 110. Access to files is generally specified with a standard application program interface (API) defining operating system calls such as Open/Close and Read/Write that an application 110 uses for accessing files. A file system may be provided as a component of an operating system, or a file system may be provided as an independent software component.

The term "sparse file" may be defined as a file in which contiguous sections of the file that are all zeros are not allocated actual blocks of storage. In this way, a sparse file saves storage space for files that have large holes or blank spaces. Sparse files may store metadata to represent the empty blocks instead of the actual empty space which makes up the blocks. An advantage of using sparse files is that storage is only allocated when actually needed. Another advantage is that large files can be created even if there is insufficient free space in the file system.

File system 120 may maintain information that indicates how each file maps to the underlying storage system. In one embodiment, file system 120 may maintain extent maps to indicate how files map to the storage locations in storage devices of storage systems 130 and 150. Each file may be subdivided into any number of extents, and the extents may be stored in non-contiguous locations on the storage devices. Various file system operations can be performed on sparse files 135A-B and 165A-B by specifying sparse files 135A-B and 165A-B as the target of various file system commands. In one embodiment, one or more of sparse files 135A-B and 165A-B may be exported as a block device to application(s) 110.

Volume manager 122 may create and manage one or more volumes (e.g., volume 132) in storage systems 130 and 150. Volume 132 may be implemented on one or more physical storage devices of storage system 130. Copy management utility 127 is an application that may generate backup copies, snapshots, replicas, or the like of volume 132 and store the data in storage system 130 and/or storage system 150. Copy management utility 127 may be a backup utility and/or a replication utility.

Input/Output (I/O) router 125 may be configured to route different I/O requests to different extent maps based on characteristics associated with the requests. For example, requests targeting a single file of sparse files 135A-B or sparse files 165A-B may be routed to different extent maps depending on characteristics of the requests. In one embodiment, requests may be routed to different extent maps based on sizes of the requests. For example, for a given sparse file, requests greater than equal to a first threshold may be routed to a first extent map, requests less than the first size but greater than or equal to a second size may be routed to a second extent map, requests less than the second size but greater than or equal to a third size may be routed to a third extent map, and so on.

Storage systems 130 and 150 may include any number and type of physical storage devices (e.g., hard disks, solid-state drives). Additionally, storage systems 130 and 150 may implement different deduplication policies using deduplication engines 133 and 162, respectively, based on the characteristics of the requests and/or based on the routing of requests to extent maps. In one embodiment, storage system 150 may include file system 155 which includes I/O router 160 for routing requests of a single file to different extent maps based on the I/O pattern and attributes of the requests. In some embodiments, file system 120 may be a file system client which translates requests generated by application(s) 110 into common internet file system (CIFS) or network file system (NFS) protocol messages which are conveyed to file system 155 of storage system 150. In one embodiment, one or more of sparse files 165A-N may be backup copies of a database which are exported as block devices to application(s) 110. These backup copies may then be utilized for test driven development and other purposes. In one embodiment, file system 155 may export a given sparse file 165A as a block device. Other users may access sparse file 165A via file system 155. Access to sparse file 165A can be enabled using a file-sharing protocol (e.g., NFS, CIFS) to provide shared access to the sparse file 165A.

Network 140 may be any type of network or combination of networks, including wireless connection, direct local area network (LAN), metropolitan area network (MAN), wide area network (WAN), a Public Switched Telephone Network (PSTN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 140 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 140.

It is noted that system 100 may include other components and/or the components may be arranged differently in other embodiments. Additionally, while FIG. 1 depicts application(s) 110, operating system 115, file system 120, volume manager 122, I/O router 125, and copy management utility 127 as independent modules, it is noted that in alternative embodiments, the functionality of these modules may be combined and/or implemented in other ways. For example, file system 120 and I/O router 125 may be combined into a single module. Additionally, the functionality of application(s) 110, operating system 115, file system 120, volume manager 122, I/O router 125, and copy management utility 127 may be implemented in different devices or systems (as opposed to being implemented within a single computing system as shown in FIG. 1). For example, application(s) 110 may be implemented on a server, while copy management utility 127 may be implemented on a network appliance interposed between the server and the storage system storing volume 132.

Figure 2:
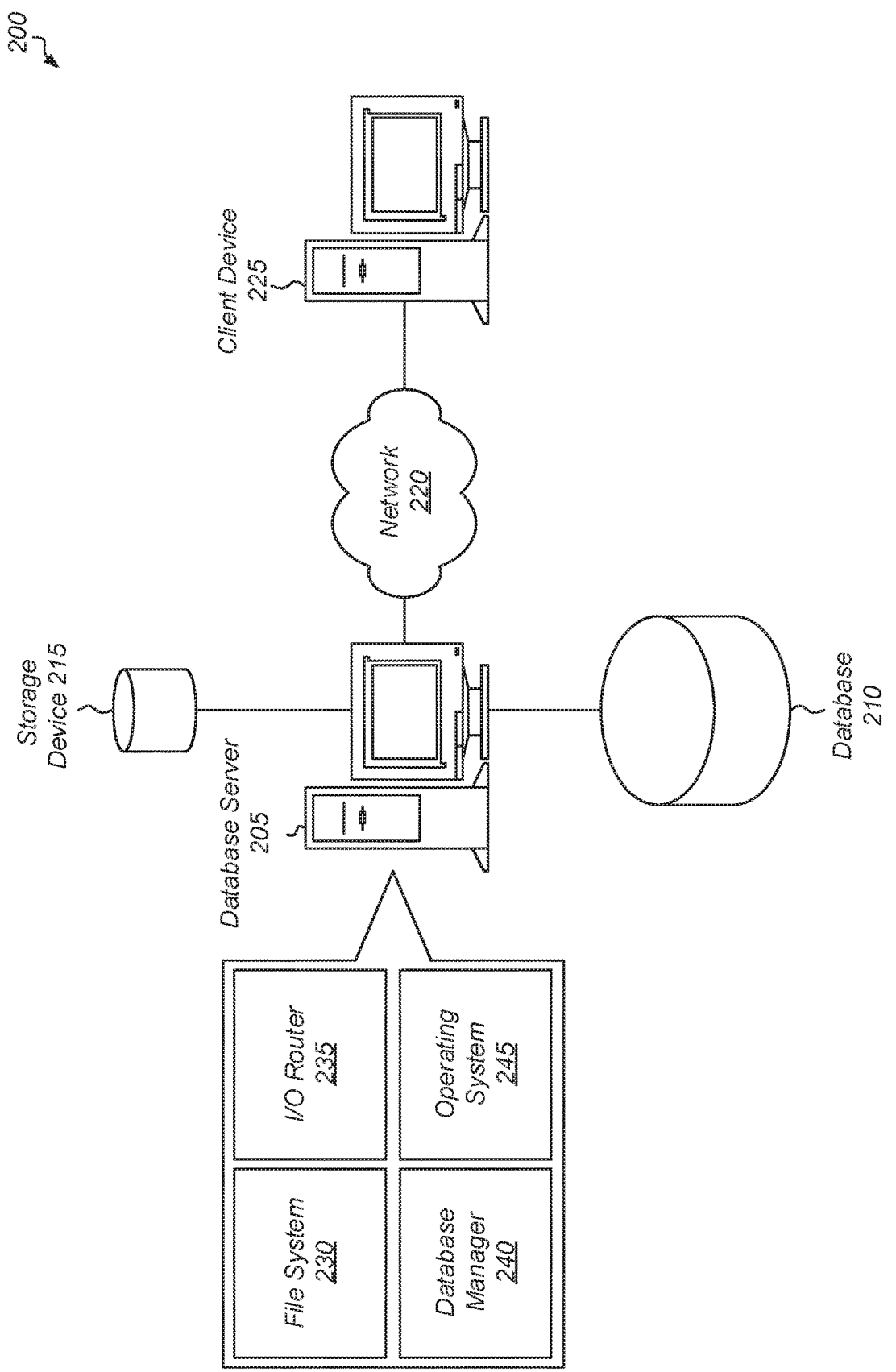
FIG. 2 is a block diagram of one embodiment of a computing system.

Turning now to FIG. 2, a block diagram of one embodiment of a computing system 200 is shown. Computing system 200 includes a database server 205 connected to a storage device 215 and a database 210. The database server 205 is also connected to a client device 225 via a network 220. In another embodiment, the database server 205 may be connected to one or more devices (e.g., the storage device 215 or the database 210) via another computing device (e.g., a media server configured to manage the storage device 215) and/or a network (such as the network 220). In a further embodiment, some processes, applications, or data illustrated as being hosted by the database server 205 (e.g., file system 230, I/O router 235) may be hosted by one or more other systems or devices.

Database 210 may represent one or more storage devices, a database program, one or more actual databases (e.g., several nodes or computing devices) implemented therein, or any combination thereof. The database program refers to the executable commands, user interfaces and other program code for operating the database. The included databases may further comprise various tables, indexes, relationships, queries, stored procedures, file systems, security layers, networking interfaces, etc., which are configured to operate on a plurality of data records. Although FIG. 2 illustrates the database 210 as being separate from the database server 205, in other embodiments, the database 210 may execute on or may be otherwise integrated into the database server 205 or another computing device (e.g., the client device 225).

Database server 205 includes file system 230, I/O router 235, database manager 240, and operating system 245 that, together, facilitate access to or otherwise manage the database 210, the storage device 215, or both. Storage device 215 may store one or more backups of one or more databases (e.g., the database 210 and another database). In one embodiment, the backup(s) may be stored in sparse files which are exported as block devices to one or more applications and/or clients. Storage device 215 may be representative of any number of storage devices, and may comprise any of a variety of types of storage media, such as a hard drive, solid state drive, disk volume, server blade, flash drive, optical drive, tape drive, tape volume, robotic tape library, or other storage medium. In some embodiments, the storage device 215 may include the database 210 (e.g., the database 210 and the backup may occupy different portions of the storage device 215). The storage device 215 may be included in the database server 205, the client device 225, or another computing device.

Network 220 may include a variety of network connections including combinations of local area networks (LANs), such as Ethernet networks and Fibre Channel (FC) networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks such as a virtual private network (VPN) implemented over a public network (e.g., the Internet). Other network connections and architectures are possible and contemplated.

Client device 225 may include one or more user interfaces and may facilitate communication between a user or system administrator and the database server 205 via the network 220. For example, the client device 225 may send one or more requests to the database server 205 for data stored at the database 210. In some cases, the user may wish to create a backup of the database 210. On behalf of the user, the client device 225 may send one or more requests to the database server 205 to request that a backup of the database 210 be created on storage device 215 (or another storage device or storage system).

Figure 3:
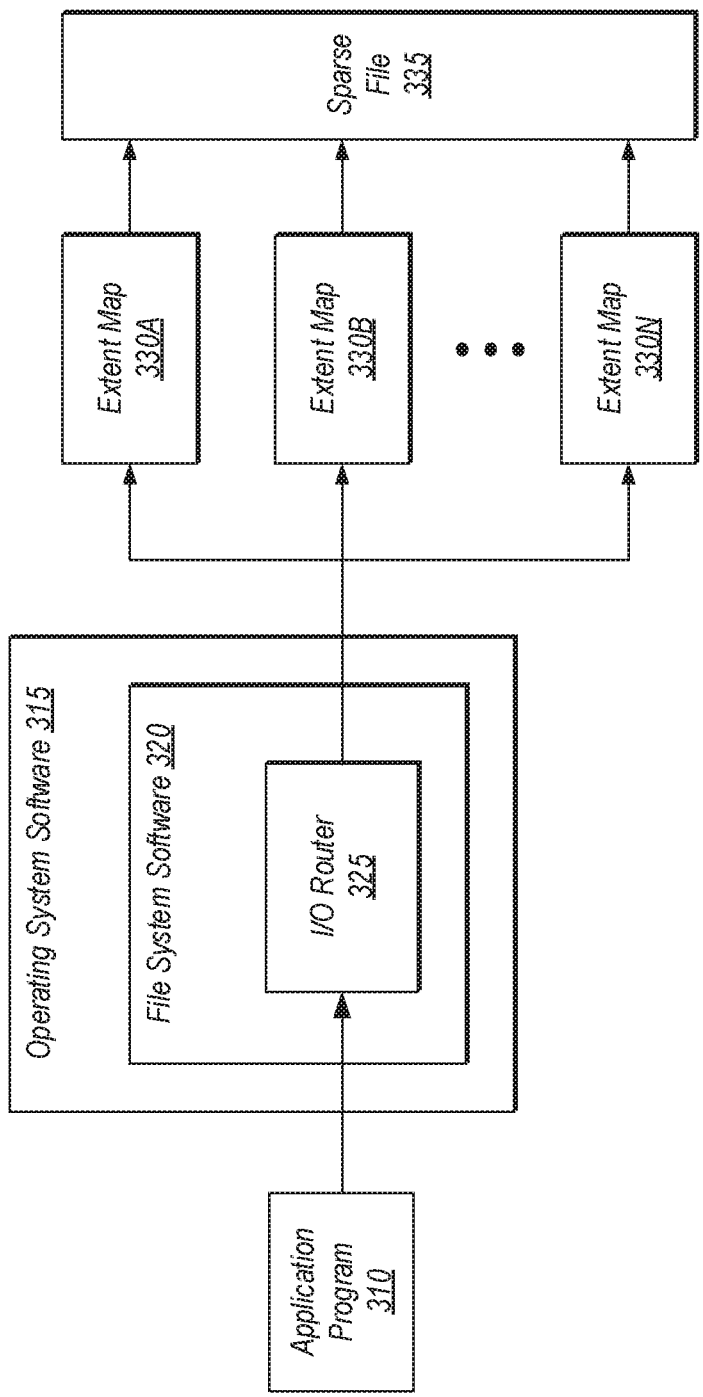
FIG. 3 is a block diagram of one embodiment of software components of a computer system.

Referring now to FIG. 3, a block diagram of software components of a computer system is shown. A computer system typically executes operating system software that performs basic functions required for management and operation of the computer system. The operating system software typically includes file system software which provides application programming interfaces (APIs) that application programs call to perform I/O operations on files. Operating system software 315 may include file system software 320, and the file system software 320 may include the I/O router 325. In one embodiment, I/O router 325 may operate at the level of the file system software 320.

In one embodiment, the file system software 320 may provide programming interfaces that allow the I/O router 325 to be integrated into the file system software 320 in order to intercept I/O requests. Integrating the I/O router 325 with the file system software 320 may enable the I/O requests for sparse file 335 to be redirected to a split extent map in a manner that is entirely transparent to the application program 310. For example, a single extent map for a single file may be split into multiple extent maps to reduce the contention for accesses to the single extent map. As shown in FIG. 3, a single sparse file 335 may have multiple extent maps 330A-N.

It is noted that in some embodiments the I/O router 325 may comprise multiple software components or modules that communicate with each other to perform various functions. In some embodiments, one or more of the components or modules of the I/O router 325 may not operate at the level of the file system software 320. However, the I/O router 325 may include at least one component or module that intercepts I/O requests at the file system level.

I/O router 325 may receive requests from application program 310 targeting sparse file 335. I/O router 325 may be configured to route requests targeting sparse file 335 to different extent maps 330A-N based on one or more attributes of the requests. In one embodiment, I/O router 325 may determine how to route requests to the different extent maps 330A-N based on sizes of the requests. For example, requests of a first size may be routed to extent map 330A, requests of a second size may be routed to extent map 330B, and so on. An advantage of splitting up a single extent map into extent maps 330A-N and routing requests to different extent maps 330A-N is that the extent maps 330A-N may be accessed in parallel. This prevents a single extent map from being the bottleneck for accesses to sparse file 335. For example, while a first request is accessing and/or updating extent map 330A, a second request may simultaneously access and/or update extent map 330B, a third request may simultaneously access and/or update extent map 330C, and so on.

Figure 4:
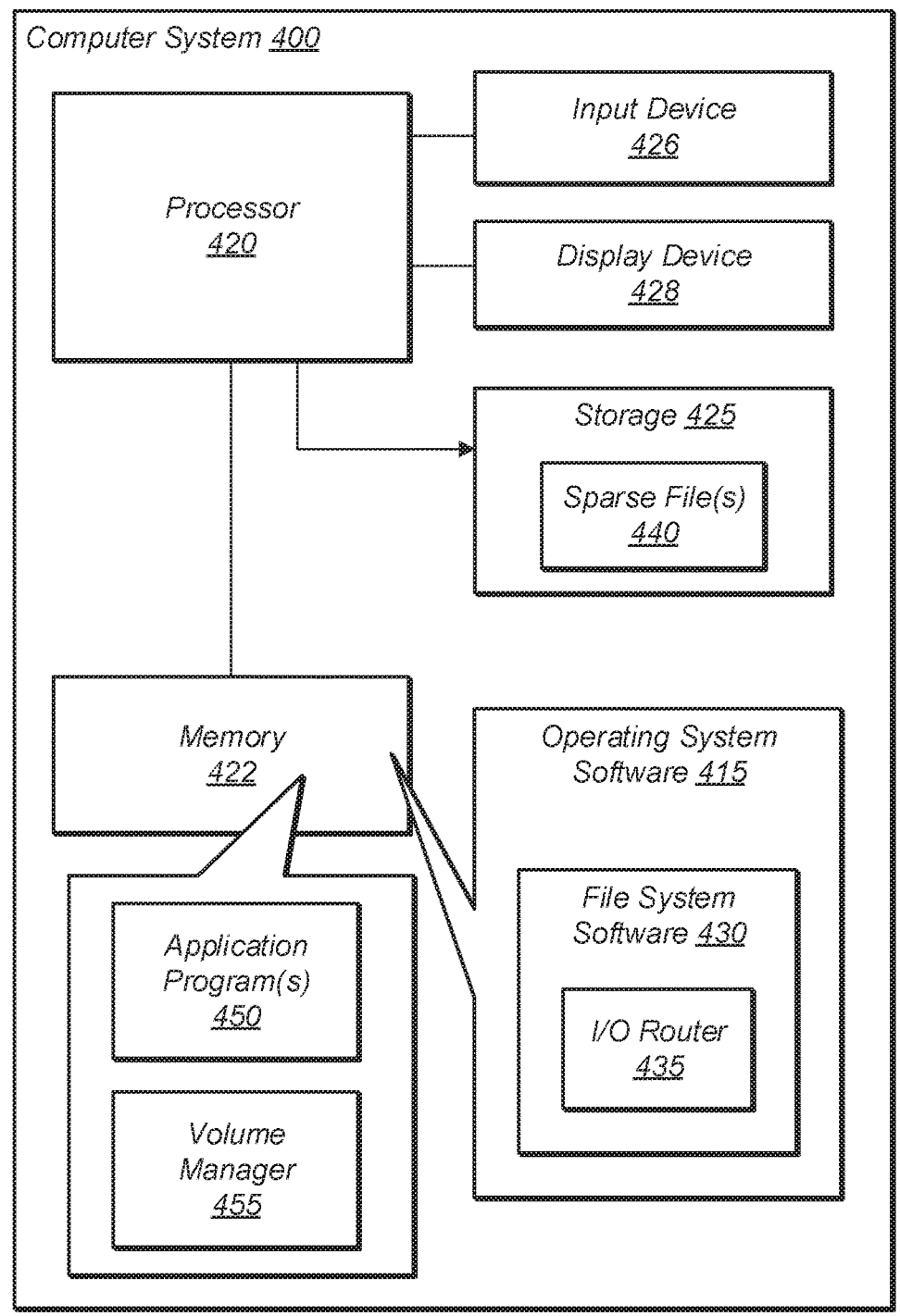
FIG. 4 is a block diagram of one embodiment of a computer system.

Turning now to FIG. 4, a block diagram of one embodiment of a computer system 400 is shown. The computer system 400 includes a processor 420 coupled to a memory 422. In some embodiments, the memory 422 may include one or more forms of random access memory (RAM) such as dynamic RAM (DRAM) or synchronous DRAM (SDRAM). However, in other embodiments, the memory 422 may include any other type of memory instead or in addition.

The memory 422 may be configured to store program instructions and/or data. In particular, the memory 422 may store operating system software 415, file system software 430, and I/O router 435. In one embodiment, the file system software 430 may be provided by the operating system software 415, and the I/O router 435 may operate at the level of or may be included in the file system software 430. The memory 422 may also store one or more application programs 450 and a volume manager 455. In one embodiment, the application programs 450 may include a database application. In one embodiment, the database may be an Oracle® database. In other embodiments, the database may be any of other types of databases.

The computer system 400 also includes storage 425 (e.g., one or more storage devices) configured to store files (e.g., sparse file(s) 440) and other data in a stable or non-volatile manner. In various embodiments, the storage 425 may include any of various kinds of storage devices, such as solid-state storage devices, optical storage devices or storage devices that utilize magnetic media. In one embodiment, the storage 425 may be implemented as one or more hard disks configured as a disk storage system. In one embodiment, the disk storage system may be an example of a redundant array of inexpensive disks (RAID) system. In another embodiment, the disk storage system may be a disk array.

The processor 420 may be configured to execute the software stored in the memory 422. In particular, the processor 420 may execute the I/O router 435 to route I/O requests targeting a single file to different extent maps based on characteristics of the I/O requests. These requests targeting a single file may include the same file handle but may be routed to different extent maps based on one or more characteristics of the requests. It is noted that the processor 420 is representative of any type of processor. Also, in one embodiment the computer system 400 may include multiple processors 420.

The computer system 400 also includes one or more input devices 426 for receiving user input from a user of the client computer system 400. The input device(s) 426 may include any of various types of input devices, such as touch pads, keyboards, keypads, microphones, or pointing devices (e.g., a mouse or trackball). The computer system 400 also includes one or more display devices 428 for displaying output to the user. The display device(s) 428 may include any of various types of output devices, such as touchscreens, LCD screens or monitors, CRT monitors, etc.

Figure 5:
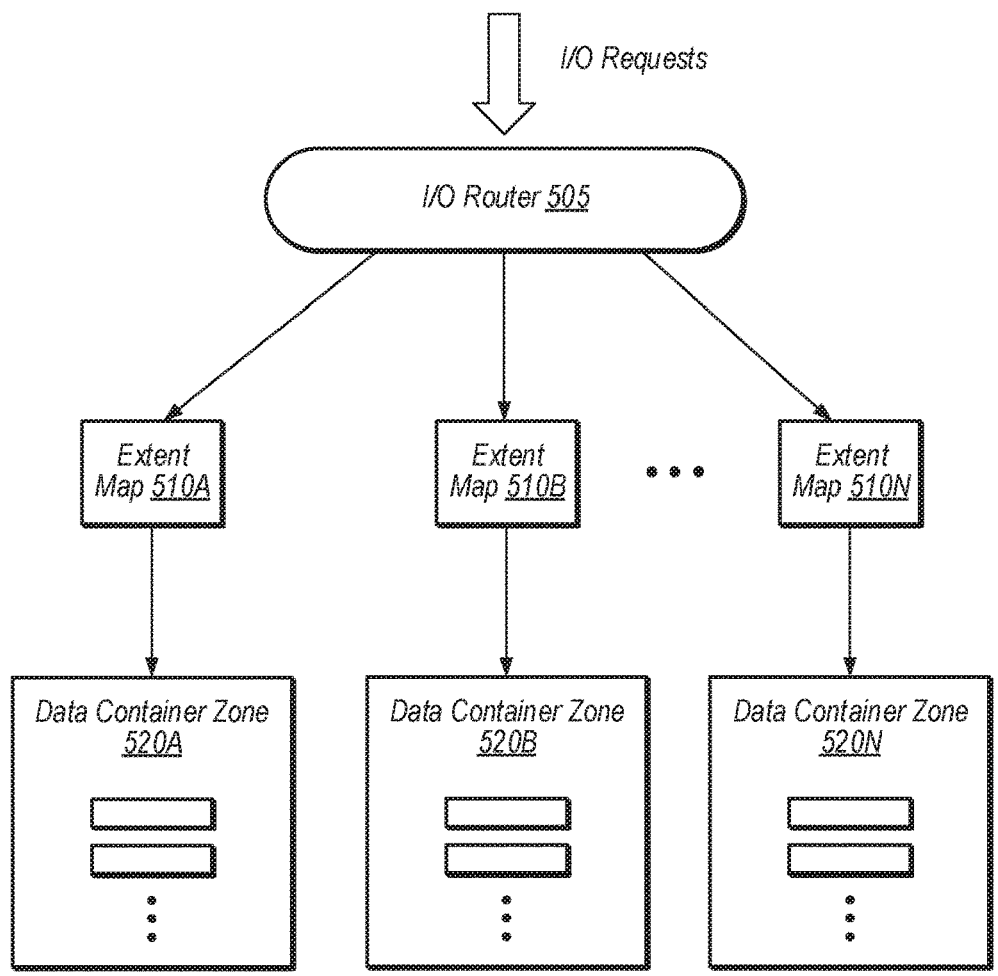
FIG. 5 is a block diagram of one embodiment of an I/O router.

Referring now to FIG. 5, a block diagram of one embodiment of an I/O router 505 is shown. I/O router 505 may be configured to receive I/O requests generated by application programs, OS software, file system software, or other software executing on a computing system (e.g., computer system 400 of FIG. 4). I/O router 505 may be configured to route requests to different extent maps 510A-N based on one or more characteristics of the requests. Depending on the embodiment, the one or more characteristics may include one or more of size, address, priority level, cache hint, R/W status, or other attributes.

Extent maps 510A-N are representative of any number of extent maps which may be utilized for a single file or other storage object. As used herein, the term "extent map" may be defined as a list or table of extent pointers that point to the data extents of a file. An extent pointer may also be referred to as an entry. Each extent pointer may specify the storage device and allocation unit of a corresponding data extent. Alternatively, each extent pointer may specify the physical storage device or partition and the offset from the beginning of the device or partition. An extent map may have any number of entries, depending on the size of the file and the size of each extent. The size of each extent may be fixed or variable, depending on the embodiment. The term "extent" (or "data extent") may be defined as the raw storage used to hold the actual data of a portion of a file. An "extent" may also be defined as one or more adjacent blocks of data within the file system. Each extent may consist of one or more allocation units on a specific storage device. In one embodiment, an extent may be an address-length pair which identifies the starting block address and the length of the extent in file system or logical blocks.

Each extent map 510A-N may map to a corresponding data container zone 520A-N. Each data container zone 520A-N may include any number of data containers for storing data of the extents mapped to the corresponding extent map. As used herein, the term "container" may be defined as an addressable logical space entity that includes a collection of contiguous logical addresses that can be mapped to one or more storage devices. A container may be addressable by I/O protocols and applications coupled to the storage system. A container may be an object which may have other embedded objects, such as a file, directory, file system, or volume. The container may be a logical volume, a partition within a logical volume, or any portion of the logical address space of the system. Each data container zone 520A-N may have a deduplication policy that is defined for the specific zone. Accordingly, a first data container zone 520A may have a first deduplication policy, a second data container zone 520B may have a second deduplication policy, and so on. A deduplication policy may specify whether deduplication is enabled for the zone, what type of deduplication is enabled, what size of data segments are to be deduplicated, and so on.

Figure 6:
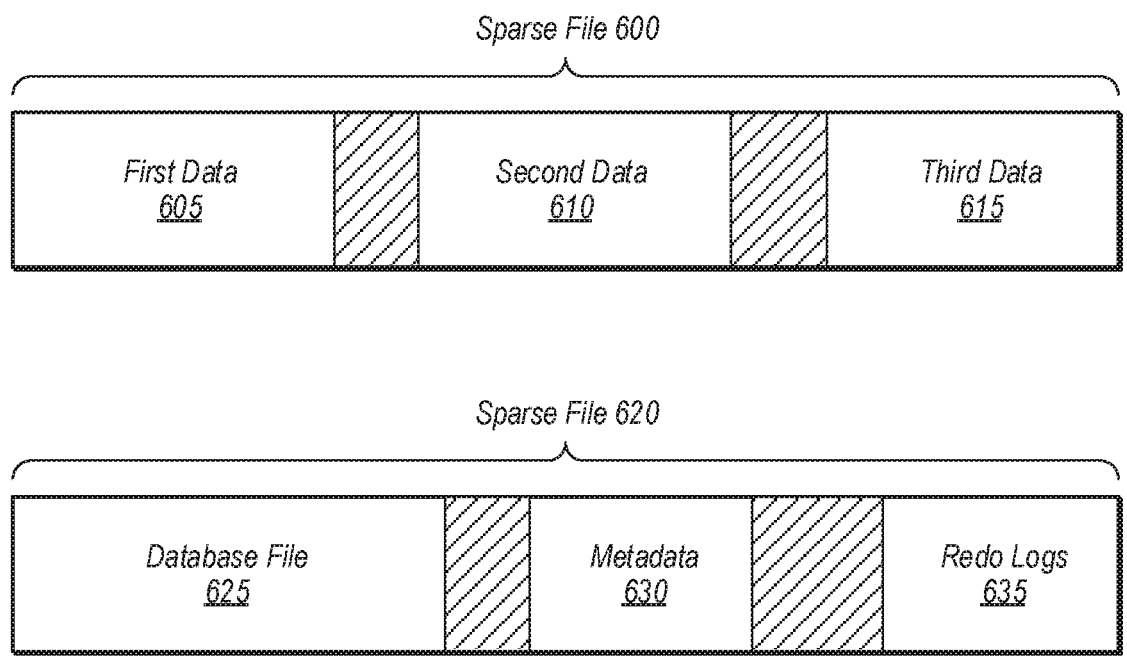
FIG. 6 illustrates two logical representations of sparse files.

Turning now to FIG. 6, two logical representations of sparse files are shown. Sparse file 600 is representative of one sparse file, and sparse file 600 may include first data 605, second data 610, and third data 615. In other embodiments, sparse file 600 may include other numbers of regions for storing different types of data. In one embodiment, each separate region of sparse file 600 may include a separate extent map. An I/O router (e.g., I/O router 325 of FIG. 3) may be configured to route the first data 605 to a first extent map, the second data 610 to a second extent map, the third data 615 to a third extent map, and so on. In this way, the concurrency problem of serializing accesses to sparse file 600 may be prevented by performing accesses to the separate extent maps in parallel.

Sparse file 620 is representative of another sparse file which may be utilized by a computing system to store different types of data. In one embodiment, sparse file 620 may be exported as a block device to one or more application programs of one or more computing systems. As shown in FIG. 6, sparse file 620 represents a database or a backup of a database which may be utilized by a database application. Sparse file 620 may include database file 625, metadata 630, and redo logs 635. Each separate region of sparse file 620 may have its own extent map. In this way, accesses to the extent map of database file 625 will not interfere with accesses to the extent maps of metadata 630 or redo logs 635.

In one embodiment, the I/O router may route I/O requests to the different extent maps based on the size of the request. For example, in one embodiment, I/O requests targeting database file 625 of sparse file 620 may be 8 kilobytes (KB) or greater with an 8 KB alignment, I/O requests targeting metadata 630 of sparse file 620 may be 4 KB, and I/O requests targeting redo logs 635 of sparse file 620 may be less than 4 KB. Accordingly, I/O requests targeting sparse file 620 that are 8 KB or greater may be routed to a first extent map corresponding to database file 625, I/O requests targeting sparse file 620 that are 4 KB may be routed to a second extent map corresponding to metadata 630, and I/O requests targeting sparse file 620 that are less than 4 KB may be routed to a third extent map corresponding to redo logs 635. In other embodiments, other size thresholds may be utilized to route I/O requests to different extent maps. In one embodiment, data corresponding to requests targeting the first extent map may be deduplicated while data corresponding to requests targeting the second and third extent map may not be deduplicated. In other embodiments, other deduplication policies may be employed for data corresponding to the first, second, and third extent maps.

Figure 7:
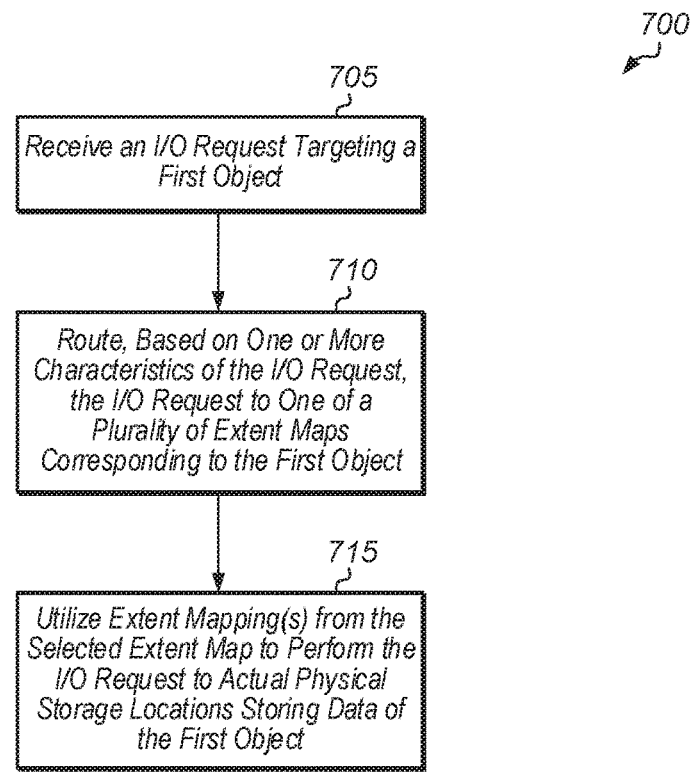
FIG. 7 is a generalized flow diagram illustrating one embodiment of a method for routing I/O requests.

Referring now to FIG. 7, one embodiment of a method 700 for routing I/O requests is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 700.

An I/O router may receive, from a software application, an I/O request targeting a first object (block 705). In one embodiment, the first object may be a file. In one embodiment, the software application may be a database application. In response to receiving the I/O request targeting the first object, the I/O router may route, based on one or more characteristics of the I/O request, the I/O request to one of a plurality of extent maps corresponding to the first object (block 710). For example, in one embodiment, if the size of the I/O request is greater than or equal to a first threshold, the I/O request may be routed to a first extent map. Additionally, in this embodiment, if the size of the I/O request is less than the first threshold, the I/O request may be routed to a second extent map. Other thresholds may be utilized to map the I/O request to additional extent maps.

Then, the extent mapping(s) from the selected extent map may be utilized to perform the I/O request to actual physical storage locations storing data of the first object (block 715). In one embodiment, one or more extent mappings from the extent map may be provided to the requesting software application, and the requesting software application may complete the I/O access to the storage locations. In another embodiment, the file system or other software may utilize the extent mappings to complete the I/O access to the storage locations. After block 715, method 700 may end.

It is noted that multiple instances of method 700 may be performed in parallel for a plurality of requests targeting the first object. Accordingly, multiple extent maps of the first object may be accessed simultaneously by the plurality of requests. This may help reduce the latency for accessing the first object since I/O requests addressed to the first object may be routed to different extent maps.

Figure 8:
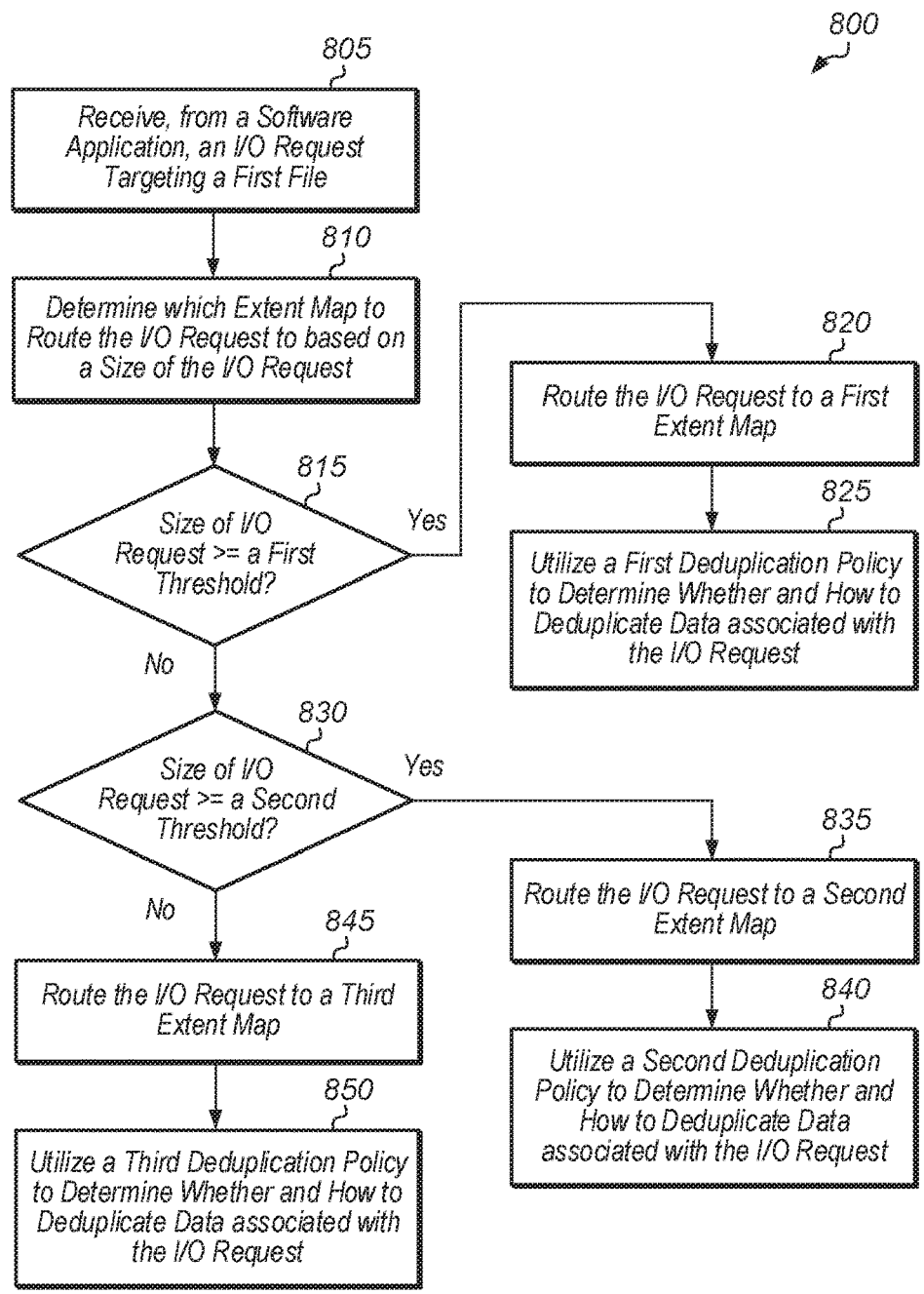
FIG. 8 is a generalized flow diagram illustrating another embodiment of a method for routing I/O requests.

Turning now to FIG. 8, another embodiment of a method 800 for routing I/O requests is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 800.

A computing system may receive, from a software application, an I/O request targeting a first file (block 805). In one embodiment, the first file may be a sparse file which has been exported to the software application as a block device. An I/O router may determine which extent map to route the I/O request to based on a size of the I/O request (block 810). If the size of the I/O request is greater than or equal to a first threshold (conditional block 815, "yes" leg), then the I/O request may be routed to a first extent map (block 820). Also, a first deduplication policy may be utilized to determine whether and how to deduplicate data associated with the I/O request (block 825).

If the I/O request is less than the first threshold (conditional block 815, "yes" leg), and the I/O request is greater than or equal to a second threshold (conditional block 830, "yes" leg), then the I/O request may be routed to a second extent map (block 835). It may be assumed for the purposes of this discussion that the second extent map is different from the first extent map, and it may be assumed that the second extent map may be accessed concurrently with the first extent map. Also, a second deduplication policy may be utilized to determine whether and how to deduplicate data associated with the I/O request (block 840).

If the I/O request is less than the second threshold (conditional block 830, "no" leg), then the I/O request may be routed to a third extent map (block 845). It may be assumed for the purposes of this discussion that the third extent map is different from the first extent map and different from the second extent map, and it may also be assumed that the third extent map may be accessed concurrently with the second extent map and/or with the first extent map. Also, a third deduplication policy may be utilized to determine whether and how to deduplicate data associated with the I/O request (block 850). After blocks 825, 840, and 845, method 800 may end.

It is noted that in other embodiments, other numbers of thresholds may be utilized to differentiate between I/O requests and to route the I/O requests to different numbers of extent maps. For example, in other embodiments, for a given file, there may be two different extent maps, four different extent maps, five different extent maps, and so on.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a memory; and
   one or more processors coupled to the memory; and
   circuitry, wherein the circuitry is configured to:
      receive a plurality of requests targeting a single file stored in an extent-based file system;
      identify a plurality of extent maps that correspond to the single file;
      determine which extent map of the plurality of extent maps to use for routing each of the plurality of requests, based on one or more characteristics of each of the plurality of requests;
      route a given request of the plurality of requests to a first extent map, responsive to determining a size of the given request is greater than a first threshold;
      route the given request to a second extent map different from the first extent map responsive to determining a size of the given request is less than the first threshold;
      access the first extent map as an initial map used to identify first physical storage locations storing actual data corresponding to the first extent; and
      access the second extent map, simultaneous with the access of the first extent map, as an initial map used to identify second physical storage locations storing actual data corresponding to the second extent.

2. The system as recited in claim 1, wherein the circuitry is further configured to:
   route a first request of the plurality of requests to the first extent map based on one or more characteristics of the first request; and
   route a second request of the plurality of requests to the second extent map based on one or more characteristics of the second request, wherein the second extent map is different from the first extent map.

3. The system as recited in claim 2, wherein the circuitry is configured to:
   utilize a first deduplication policy for the first request routed to the first extent map targeting the single file; and
   utilize a second deduplication policy for the second request routed to the second extent map targeting the single file, wherein the second deduplication policy is different from the first deduplication policy.

4. The system as recited in claim 1, wherein the one or more characteristics comprise a size of a given request, and wherein the circuitry is configured to:
   determine a size of each of at least two requests;
   determine which extent map of the plurality of extent maps that correspond to the single file to use for routing the at least two requests, based at least in part on a size of each of the at least two requests; and
   concurrently route the at least two requests to the single file using at least two extent maps of the plurality of extent maps.

5. The system as recited in claim 1, wherein the circuitry is configured to route the given request to the second extent map in further response to determining a size of the given request is greater than or equal to a second threshold, and the circuitry is further configured to
   route the given request to a third extent map different from the first extent map and the second extent map responsive to determining a size of the given request is less than the second threshold.

6. The system as recited in claim 1, wherein the circuitry is configured to access one or more of the plurality of extent maps as an only map between an extent of a plurality of extents of the single file and physical storage locations storing actual data of the extent.

7. The system as recited in claim 1, wherein the circuitry is configured to receive the plurality of requests from a software application, and wherein the software application is a database application.

8. A method comprising:
   receiving a plurality of requests targeting a single file stored in an extent-based file system;
   identifying a plurality of extent maps that correspond to the single file;
   determining which extent map of the plurality of extent maps to use for routing each of the plurality of requests;
   routing a given request of the plurality of requests to a first extent map, responsive to determining a size of the given request is greater than a first threshold;
   routing the given request to a second extent map different from the first extent map responsive to determining a size of the given request is less than the first threshold;
   accessing the first extent map as an initial map used to identify first physical storage locations storing actual data corresponding to the first extent; and
   accessing the second extent map, simultaneous with the access of the first extent map, as an initial map used to identify second physical storage locations storing actual data corresponding to the second extent.

9. The method as recited in claim 8, further comprising:
   routing a first request of the plurality of requests to the first extent map based on one or more characteristics of the first request; and
   routing a second request of the plurality of requests to the second extent map based on one or more characteristics of the second request, wherein the second extent map is different from the first extent map.

10. The method as recited in claim 9, further comprising:
    utilizing a first deduplication policy for the first request routed to the first extent map targeting the single file; and
    utilizing a second deduplication policy for the second request routed to the second extent map targeting the single file, wherein the second deduplication policy is different from the first deduplication policy.

11. The method as recited in claim 8, wherein the one or more characteristics comprise a size of a given request, and wherein the method comprises:
- determining a size of each of at least two requests;
- determining which extent map of the plurality of extent maps that correspond to the single file to use for routing the at least two requests, based at least in part on a size of each of the at least two requests; and
- concurrently routing the at least two requests to the single file using at least two extent maps of the plurality of extent maps.

12. The method as recited in claim 8, further comprising:
- routing the given request to the second extent map in further response to determining a size of the given request is greater than or equal to a second threshold; and
- routing the given request to a third extent map different from the first extent map and the second extent map responsive to determining a size of the given request is less than the second threshold.

13. The method as recited in claim 8, further comprising accessing one or more of the plurality of extent maps as an only map between an extent of a plurality of extents of the single file and physical storage locations storing actual data of the extent.

14. The method as recited in claim 8, further comprising receiving the plurality of requests from a software application, and wherein the software application is a database application.

15. A non-transitory computer readable storage medium storing program instructions, wherein the program instructions are executable by a processor to:
- receive a plurality of requests targeting a single file stored in an extent-based file system;
- identify a plurality of extent maps that correspond to the single file;
- determine which extent map of the plurality of extent maps to use for routing each of the plurality of requests, based on one or more characteristics of each of the plurality of requests;
- route a given request of the plurality of requests to a first extent map, responsive to determining a size of the given request is greater than a first threshold;
- route the given request to a second extent map different from the first extent map responsive to determining a size of the given request is less than the first threshold;
- access the first extent map as an initial map used to identify first physical storage locations storing actual data corresponding to the first extent; and
- access the second extent map, simultaneous with the access of the first extent map, as an initial map used to identify second physical storage locations storing actual data corresponding to the second extent.

16. The non-transitory computer readable storage medium as recited in claim 15, wherein the program instructions are further executable by a processor to:
- route a first request of the plurality of requests to the first extent map based on one or more characteristics of the first request; and
- route a second request of the plurality of requests to the second extent map based on one or more characteristics of the second request, wherein the second extent map is different from the first extent map.

17. The non-transitory computer readable storage medium as recited in claim 16, wherein the program instructions are further executable by a processor to:
- utilize a first deduplication policy for the first request routed to the first extent map targeting the single file; and
- utilize a second deduplication policy for the second request routed to the second extent map targeting the single file, wherein the second deduplication policy is different from the first deduplication policy.

18. The non-transitory computer readable storage medium as recited in claim 15, wherein the one or more characteristics comprise a size of a given request, and wherein the program instructions are further executable by a processor to:
- determine a size of each of at least two requests;
- determine which extent map of the plurality of extent maps that correspond to the single file to use for routing the at least two requests, based at least in part on a size of each of the at least two requests; and
- concurrently route the at least two requests to the single file using at least two extent maps of the plurality of extent maps.

19. The non-transitory computer readable storage medium as recited in claim 15, wherein the program instructions are further executable by a processor to:
- route the given request to the second extent map in further response to determining a size of the given request is greater than or equal to a second threshold; and
- route the given request to a third extent map different from the first extent map and the second extent map responsive to determining a size of the given request is less than the second threshold.

20. The non-transitory computer readable storage medium as recited in claim 15, wherein the program instructions are further executable by a processor to access one or more of the plurality of extent maps as an only map between an extent of a plurality of extents of the single file and physical storage locations storing actual data of the extent.

* * * * *